United States Patent [19]

Behnke et al.

[11] 4,431,619
[45] Feb. 14, 1984

[54] PROCESS FOR THE THERMAL POLYMERIZATION OF PHOSPHAZENE POLYMERS

[75] Inventors: Joachim Behnke, Amorbach; Dieter Huff, Obernburg, both of Fed. Rep. of Germany

[73] Assignee: Akzo NV, Arnhem, Fed. Rep. of Germany

[21] Appl. No.: 433,803

[22] Filed: Oct. 8, 1982

Related U.S. Application Data

[63] Continuation of Ser. No. 337,242, Jan. 4, 1982, abandoned, which is a continuation of Ser. No. 127,401, Mar. 5, 1980, abandoned.

[30] Foreign Application Priority Data

Mar. 19, 1979 [DE] Fed. Rep. of Germany ....... 2910794

[51] Int. Cl.$^3$ .............................................. C01B 25/10
[52] U.S. Cl. ..................................................... 423/300
[58] Field of Search ......................................... 423/300

[56] References Cited

U.S. PATENT DOCUMENTS 4,139,598   2/1979   Reynard et al. ................... 423/300

Primary Examiner—Helen M. McCarthy
Assistant Examiner—Wayne A. Langel
Attorney, Agent, or Firm—Michael J. Striker

[57] ABSTRACT

Process for the production of phosphazo polymers by thermal polymerization of a cyclic compound of the formula $(NPCl_2)_n$ in which n is an integer from 3 to 10 in the presence of a catalyst of the general formula $R-O-SO_2-R^1$.

8 Claims, No Drawings

PROCESS FOR THE THERMAL POLYMERIZATION OF PHOSPHAZENE POLYMERS

This is a continuation, of application Ser. No. 337,242, filed Jan. 4, 1982, now abandoned which is in turn a continuation of application Ser. No. 127,401, filed Mar. 5, 1980, now abandoned.

The invention relates to a process for the production of phosphazene polymers by thermal polymerization, in the presence of a catalyst, of a cyclical compound or a mixture of such compounds of the formula $(NPCl_2)_n$, wherein n denotes 3 to 10.

Proceeding from a basic polymer $(NPCl_2)x$. numerous polymer products may be produced which, by the selection of suitable substituents, will have differing properties thus opening up a multitude of possible applications. In the production of the basic polymers, the rings of cyclical monomers are broken and polymerized with reactive chlorine atoms into a linear polymer.

The reaction of breaking the ring ensues at higher temperature and with the aid of catalysts. The course of the reaction is to be envisaged by the following scheme:

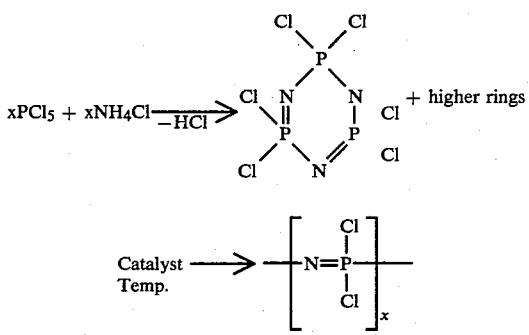

In the DE Letter of Disclosure 27 54 245, a catalytic process for the production of phosphazene polymers from cyclic monomers is described, wherein thermal polymerization is made in the presence of a catalytically active quantity of Lewis acid as catalyst.

It has been shown that basic polymers of a relatively small molecular weight (approx. 100,000 to 250,000) will result with this process, with a high catalyst concentration required therefor if the reaction times are to be kept within tolerable limits. The molecular distribution is relatively wide, although calculation will already yield discrepancies, albeit tolerable, these discrepancies, however, only appearing a such by reason of the relatively small molecular weight. The products are still relatively light-flowing.

DE Letter of Disclosure No. 22 49 461 described that mixtures of monomers, particularly those with n=3 and 4, are particularly suitable for thermal polymerization without any gel being formed therein. Catalysts are not noted in the aforenoted letter of disclosure.

DE Letters Patent describe carbonic acid catalysts with which polymerization to a high degree could be attained within 24 hours at 210° C. A similar catalytic efficacy could be reached with sulfur at 215° to 245° C., as well as with dialkyl paracresol, hydroquinone and quinone ("Phosphorus Nitrogen Compounds" academic Press, 1972, p. 316 et sequ.).

Alkoxide catalysts are also presumed to be well effective, however only low-molecular linear polydichloro phosphazenes with a wide molecular distribution (bimodal molecular weight distribution) will be formed. A process of this kind is described in DE Letter of Disclosure No. 27 45 885.

It was the task of the present invention to determine such catalysts for a catalytic process for the thermal polymerization of cyclical compounds, or a mixture of these compounds of the general formula $(NPCl_2)n$, wherein n denotes 3 to 10, allowing to obtain within a short polymerization time products of high molecular weight and of a defined low discrepancy in uniformity.

Apart from the possibility of obtaining at will, discrepancies between 2 and 10, the production of polymers with hitherto unknown small discrepancies of the magnitude of 2 is also an objective of the invention.

As per invention, this objective is attained by a process characterized by polymerization being made in the presence of compounds of the general formula $R-O-SO_2-R'$, wherein R and R' may be identical or different substituents and may denote the following: hydrogen atoms, halogen atoms, ammonia, amine, aliphatic alkyl groups with 1 to 12 C atoms, substitued or unsubstituted cycloaliphatic groups, heterocyclic groups and such groups wherein R and R' are closed into a ring and which contain as the ring atom the sulfur atom of the general formula.

The basic phosphazene polymers produced by the process as per invention are of a bright color in solution or in the melt, they are clear and will practically not flow any further. The molecular weight will, with great uniformity, be approximately 700,000 to 1.2 millions (after reaction of reactive Cl groups with Na phenolate). Those phosphazene polymers still containing reactive chlorine substituents are to be understood as basic polymers. By reaction with compounds that exchange the chlorine against other suitable substituents, a large number of phosphazene polymers may be produced which, due to their differing properties, may be considered for numerous applications.

In a preferred embodiment of the invention, thermal polymerization is made in the presence of toluene sulfonic acid esters as catalyst. The methyl ester, the ethyl ester, the isopropyl ester and the pyridyl ester have particularly proved themselves herein.

Particularly effective catalysts are also such catalysts wherein R and R' are closed into a ring and which contain as ring atom the sulfur atom of the general formula. Sulfones are to be named here in the first line, among which the $\beta$-trichloromethyl-$\beta$-propiosulfone is a particularly outstanding catalyst.

In a preferred embodiment, the process as per invention is implemented in the liquid phase in a proton-free solvent. Contingent upon the concentration of the solution, the temperature, the polymerization time, the catalyst, and the catalyst concentration, discrepancies ranging from about 2 to 10 at high molecular weight may be obtained at will. Polymers of particularly high uniformity are very frequently desired and may be produced by the process as per invention without difficulty, and to a magnitude of about 2. For reasons of further processing, or on account of certain physical properties, it may, however, be desirable to produce polymers of a certain discrepancy in their uniformity.

By suitably varying the conditions of reaction, the process as per invention will allow herein obtaining of such discrepancies as may be desired.

Chlorinated proton-free solvents such as carbon tetrachloride, and hexachloroethane are particularly suitable herein.

Proton-free fluoro-chloro hydrocarbons such as fluoro-hydrocarbons are less suitable for polymerization in the homogeneous liquid phase, since at a certain molecular weight, the basic polymer will become insoluble and precipitate.

Preferred reactive conditions for production of polymers of a possibly high uniformity, are reactive conditions (pressure and temperature) situated just below the critical point of the solvent; the temperature should, however, not be selected above 350° C., otherwise conditions may be created that would excessively favor reverse reaction.

The process as per invention may also advantageously be implemented in the melt, if commingling to the highest possible degree can be ensured over the longest possible period. The necessity of separating and recovering the solvent would then be obviated herein.

Polymerization in the melt is implemented, contingent upon the desired product, at temperatures between 180° and 350° C., and at the vapor pressure of the monomers.

The polymers as per invention may, for instance, be used in the production of filament, fibers and film. They may be reacted, for instance, with the reactants listed in "Angewandte Chemie", vol. 89, (1977), pp. 153 to 162, and will yield valuable products resistant against water and oil, noncombustible, elastic, UV transmitting and even bio-compatible.

The invention is described more closely with the aid of the following embodiments (see table).

For the production of the basic polymer samples, bomb tubes were filled with 7 g, (0.06 mols) $(NPCl_2)_3$, 10 ml $CCl_4$ p.a. and quantities of catalyst as shown in the tables.

After cooling by means of solid carbon dioxide/aceton, the samples were evacuated to $10^{-2}$ torr and then aired with dry, $O_2$-free nitrogen. This sequence was repeated five times. Subsequently, the samples where melted after evacuation to $10^{-2}$ Torr.

The bomb tubes were attached by means of coil springs, lateral to the rotatable axle of an air circulation furnace, so that an adequate commingling effect was ensured. The furnace was heated to the desired temperature. The progress of polymerization could be judged by the changes in color and viscosity of the deposits. The experiments were terminated upon the substances in the bomb tube not being flowable any longer.

The bomb tubes were opened after cooling, and the contents inserted into a 250 mL circular flask. The solvent was removed at the oil pump at 50° C., and the residue dissolved in 100 mL anhydrous toluene. 60 mL Na-phenolate solution in diethyleneglycol dimethylether (corresponding to 0.15 mols Na phenolate) were added wherein an immediate exothermic heat tone could be observed. The mixture was then agitated for 40 hours at 110°–115° C. and the cooled solution filled into a three to fourfold quantity of methanol, with the resultant poly-diphenoxyphosphazene precipitating herein as white flakes.

After acidulation of the suspension with concentrated HCl, syphoning off was performed and repeated elution made with methanol. Drying was subsequently performed in vacuum at 50° C. Transformation into diphenoxy compounds was made in order to have chemically stable products available for the subsequent physical investigations.

Molecular weights and molecular weight distribution of the linear, network-free polyphosphazenes produced with the catalysts as per invention, were determined with the aid of gel-permeation chromatography at 7° C., using therein the method of gel-permeation chromatography of fluorinated polyphosphazenes described by D. W. Carlson et al. in the Journal of Polymer Science 14, (1976), 1379–1395.

Polystyrene samples of known molecular weight and known molecular weight distribution were used as calibrating substances.

The polymer samples were produced as 0.5% solutions in DMF at 75° C., and gel-permeation chromatography performed with the aid of a Waters Model 200 apparatus. Separation was made herein contrary to Carlson who had used 4 styragel columns with a pore size of $10^6$ Å in four styragel columns each 1.22 meters long with a pore size of $10^3$, $10^4$, $10^5$ and $10^6$ Å at a flow rate of 1 mL/min DMF. This selection of pores will allow achievement of better resolution of chromatographs within the low-moleculat range.

The results are listed in the following table.

| Experiment No. | Catalyst | Concentr. % by w't | Polymer concentr. % by w't | Solvent | Temp °C. | Time hrs | Mw/Mn | MW | Yield % |
|---|---|---|---|---|---|---|---|---|---|
| 1 | $Cl_3C-CH-O$<br>         $|$      $|$<br>    $CH_2-SO_2$ | 0,10 | 33,5 | $CCl_4$ | 260 | 25 | 6,4 | 1 180 000 | 66 |
| 2 | " | 0,18 | 58 | $CCl_4$ | 230 | 29 | 3,1 | 955 000 | 46 |
| 3 | $CH_3-SO_2-O-CH_3$ | 0,26 | 16 | $CCl_4$ | 230 | 31 | 4,9 | 690 000 | 69 |
| 4 | $CH_3-\langle\bigcirc\rangle-SO_2-O-C_2H_5$ | 0,18 | 43 | $CCl_4$ | 280 | 1,5 | 2,1 | 780 000 | 35 |
| 5 | $CH_2-O$<br>         $\diagdown$<br>              $SO_2$<br>         $\diagup$<br>    $CH_2-CH_2$ | 0,18 | 43 | $CCl_4$ | 280 | 3 | 4,0 | 840 000 | 45 |

-continued

| Experiment No. | Catalyst | Concentr. % by w't | Polymer concentr. % by w't | Solvent | Temp °C. | Time hrs | Mw/Mn | MW | Yield % |
|---|---|---|---|---|---|---|---|---|---|
| 6 | 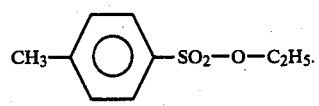 | 0,21 | 43 | CCl4 | 280 | 5 | 1,7 | 1 250 000 | 44 |
| 7 | 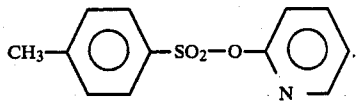 | 0,21 | 43 | CCl4 | 280 | 24 | 5,1 | 1 160 000 | 43 |
| 8 | 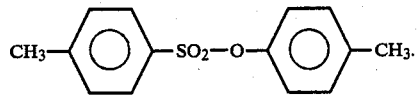 | 0,21 | 43 | CCl4 | 280 | 24 | 8,2 | 1 040 000 | 60 |
| 9 | F—SO2—O—C2H5 | 0,21 | 43 | CCl4 | 280 | 1 | 3,6 | 840 000 | 58 |

We claim:

1. Process for the production of phosphazo polymers by thermal polymerization of a cyclic compound of the formula (NPCl₂)n in which n is an integer from 3 to 10, or a mixture of such cyclic compounds, in the presence of a catalyst, wherein said catalyst is of the formula $$R-O-\overset{\overset{O}{\|}}{\underset{\underset{O}{\|}}{S}}-R',$$

R and R' are the same or different and are halogen atoms, aliphatic, alkyl groups with 1 to 12 C-atoms, cycloaliphatic groups with 1 to 12 C-atoms, with or without substitution, or aryl or heterocyclic groups, with or without substitution and forming a ring together with the $$-O-\overset{\overset{O}{\|}}{\underset{\underset{O}{\|}}{S}}- \quad \text{grouping.}$$

2. Process according to claim 1, wherein said catalyst has the formula:

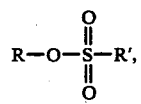

3. Process according to claim 1, wherein said catalyst has the formula:

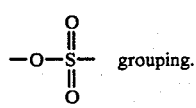

4. Process according to claim 1, wherein said catalyst is

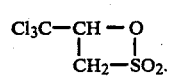

5. Process according to claim 1, wherein said catalyst is

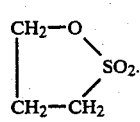

6. Process according to claim 1, wherein said catalyst is

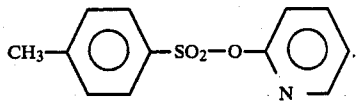

7. Process according to claim 1, wherein said catalyst is

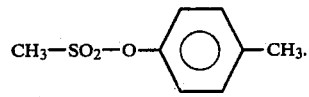

8. A process for the production of phosphazo polymers by thermal polymerization of at least one cyclic compound of the formula (NPCl₂)n, wherein n denotes an integer of 3 to 10, in the presence of toluene sulfonic acid ester as catalyst.

* * * * *